United States Patent
Mack et al.

[11] Patent Number: 5,940,374
[45] Date of Patent: Aug. 17, 1999

[54] MECHANISM FOR DETERMINING WHETHER CHANNEL UNIT IS INSTALLED IN D4 CHANNEL BANK SLOT

[75] Inventors: David L. Mack; Jason F. McCullough; Stacy M. Murphree, all of Madison, Ala.

[73] Assignee: Adtran, Inc., Huntsville, Ala.

[21] Appl. No.: 08/706,784

[22] Filed: Sep. 3, 1996

[51] Int. Cl.$^6$ ........................................ H04J 1/16
[52] U.S. Cl. .................. 370/241; 370/358; 370/359; 379/29
[58] Field of Search .................. 379/1, 4, 6, 9, 379/22, 27, 29; 370/358, 532, 535, 242, 419, 420, 421, 463, 465, 241, 357; 340/825.06

[56] References Cited

U.S. PATENT DOCUMENTS

| | | | |
|---|---|---|---|
| 5,347,576 | 9/1994 | Taylor | 379/399 |
| 5,513,173 | 4/1996 | Machemer et al. | 370/252 |
| 5,566,161 | 10/1996 | Hartmann et al. | 370/249 |
| 5,579,320 | 11/1996 | Hall, III et al. | 370/506 |
| 5,712,898 | 1/1998 | Hall, III et al. | 379/29 |

Primary Examiner—Chau Nguyen
Assistant Examiner—Soon-Dong Hyun
Attorney, Agent, or Firm—Charles E. Wands

[57] ABSTRACT

A D4 channel bank data bus monitoring scheme automatically determines if a channel unit connector slot is occupied, without having to gain physical access to the interior of the channel bank cabinet and inspect the channel bank's backplane slot positions. To this end, for a respective channel unit connector slot the channel bank's transmit data bus, which is initially pulled high via a pull-up resistor, is monitored for an all '1's state. If the data on the bus is not all '1's, then it is inferred that a channel unit is installed. If an all '1's state is not detected, then, during the next time slot for that channel unit, the bus is decoupled from the pull-up resistor and coupled instead to a 'soft' pull-down resistor. If the data on the bus is now all '0's, it is inferred that the previously read all '1's condition was due to the fact that no channel unit is installed, and the channel unit connector slot is declared as empty. However, if the data on the TDATA bus is not all '0's, it is inferred that the previously read all '1's condition was actual data asserted by an installed channel unit, and the channel unit connector slot is declared as occupied.

36 Claims, 2 Drawing Sheets

MECHANISM FOR DETERMINING WHETHER CHANNEL UNIT IS INSTALLED IN D4 CHANNEL BANK SLOT

CROSS-REFERENCE TO RELATED APPLICATIONS

The present application relates to subject matter described in U.S. Pat. No. 5,473,665 (hereinafter referenced as the '665 patent), filed Mar. 8, 1993, by Clifford Hall et al, entitled: "Performance Monitoring of DS0 Channel Via D4 Channel Bank," issued Dec. 5, 1995, and to subject matter described in patent application Ser. No. 08/404,288 (hereinafter referenced as the '288 application), filed Mar. 14, 1995, by Clifford Hall et al, entitled: "D4 Channel Bank with Multi-mode Formatted Performance Monitoring Communications Bus," now U.S. Pat. No. 5,712,898, issued Jan. 27, 1998. Each of the '665 patent and '288 application is assigned to the assignee of the present application and their respective disclosures of are herein incorporated.

FIELD OF THE INVENTION

The present invention relates in general to telephone communication systems, and is particularly directed to a modification of a D4 channel bank, such as a performance-monitoring (PM) channel bank of the type described in the above-referenced '655 patent and the '288 application, that will allow the channel bank's supervisory microcontroller to determine and provide an indication to a remote monitoring location as to whether a selected channel unit connector slot of the backplane of a D4 channel bank is empty or contains an installed channel unit.

BACKGROUND OF THE INVENTION

FIG. 1 diagrammatically illustrates an AT&T-compatible digital carrier terminal or D4 channel bank 10, such as that manufactured by Adtran Corporation, Huntsville, Ala., through which digital services may be provided by a digital carrier telephone network to digital signalling equipment located at a customer's premises 20. The channel bank 10 typically contains a line interface unit (LIU) 12 which interfaces one end of a T1 (1.544 Mb/s) time division multiplex (TDM) digital communications link 14. A second end of T1 TDM link 14 may be connected to another office, such as one containing an operational support system (OSS) 16, located remotely with respect to the office in which D4 channel bank 10 is installed.

Also contained in the D4 channel bank 10 is an office channel unit data port (OCU-DP) 18, which is coupled to LIU 12 via an intra D4 bank PCM communications link 15. OCU-DP 18 is configured to support a plurality of (e.g. twenty-four) channel units, each of which is associated with a respective (64 Kb/s) time slot of the T1 TDM link 14. The OCU-DP 18 is operative to interface bipolar signals on respective portions 21T and 21R of a local four-wire DS0 metallic (copper) link 21, which is coupled to a digital data service termination (DDST) 22, terminating the metallic loop 21 with a data service unit/channel service unit (CSU/DSU) 23 located at the customer's premises 20.

The LIU 12 and OCU-DP 18 within the D4 channel bank 10 include respective transmit/receive buffers associated with the respective (bipolar/DS1/DS0) ports of a channel unit. These buffers are controlled by a resident supervisory control microcontroller for interfacing DS1-formatted data traffic from the T1 link side of the terminal, retiming the traffic as a bipolar data stream for transmission as a DS0 data stream from the D4 channel bank 10 to the customer's DSU/CSU site 20, and reconverting bipolar signals, supplied from the customer site 20 to OCU data port 18, into DS1 data frames for transmission over T1 link 14 to the remote site.

The component and bus architecture through which LIU 12 and OCU-DP 18 of D4 channel bank 10 communicate with one another by way of PCM communications link 15 is diagrammatically shown FIG. 2. As shown therein, a respective channel unit 19 within the OCU-DP 18 has a transmitter section 31, to which DS0 data from the four wire metallic loop 21 is supplied from the customer site termination equipment. The channel unit 19 further includes a receiver section 33, from which DS0 data is coupled to four wire metallic loop 21 for delivery to the customer site termination equipment. The channel unit's transmitter section 31 is coupled via a set of transmission links 41, 43 and 45 to a transmit unit 35. The transmission link 45, labelled as TDATA bus, is employed to transport serialized data bits from the transmitter section 31 of the channel unit 19 to the transmit unit 35, during a respective time slot assigned to that channel unit. Link 41 contains a set of transmit sequence control leads on which transmission control signals TX_CNTL signals from transmit unit 35 are asserted for controlling the format of data transmissions from the channel unit 19 on the TDATA bus 45. Link 43 is a clock lead on which a transmit clock signal TD-CLK is asserted by transmitter section 31.

In response to the control and clock signals on links 41 and 43, the transmitter section 31 of the channel unit 19 decodes its respective channel select strobe and transmits data packets onto transmit data TDATA bus 45 in a respective one of a plurality (e.g. 24) multiplexed channel unit time slots of a multi-channel (e.g. 24 channel) unit digroup within the D4 bank. Pursuant to industry (AT&T-defined) communication standards, the channel select strobe occurs at an 8 KHz rate, so that with an eight bit byte being asserted for each strobe, a 64 Kb/s (DS0) channel is provided for a respective DS1 line. As data is serialized out over the TDATA bus 45, transmit unit 35 collects the 192 bits (comprised of eight bits from each of the (24) channel units), appends a framing bit, and outputs the resulting DS1-formatted (193 bit) PCM data stream onto TPCM link 51, and an associated transmit clock signal via TCLK link 53 to the LIU 12. The line interface unit 12 couples the formatted DS1 data onto the digital T1 carrier for transmission over link 14.

On the DS1 receive side, incoming T1 carrier signals from link 14 are received by line interface unit 12, and extended superframe format is converted into superframe formatted signals, as necessary. Payload or signalling bits are not altered. The DS1 data is asserted onto a receive RNPCM bus 61, which is coupled to receive unit 34 and to the receiver section 33 of each channel unit of the D4 channel bank. The DS1 clock within the T1 data is recovered by LIU 12 and applied as a recovered clock signal on RCLK link 63, which is also coupled to receive unit 34 and to the receiver section 33 of each channel unit 19.

The receive unit 34 synchronizes its timing with the DS1 framing pattern of the received signal and supplies channel unit control signals over RX_CNTL link 65 to the receiver section 33 of each channel unit in the D4 bank. This allows each channel unit to decode its channel select strobe for the received data and to extract its corresponding byte of data from the associated time slot of RNPCM data bus 61.

It should be noted that in the D4 channel bank configuration of FIG. 2, all channel units in the D4 channel bank share the transmit TDATA bus and the receive RNPCM data bus 61, so that each channel unit has physical access to every DS0 time slot in a digroup. Actual time slot allotment is carried out by control and clock signals supplied by the transmit unit 35 for the transmit direction and by the receive unit 34 for the receive direction, as described above.

The '665 patent describes an upgrade or enhancement to the office channel unit data port (OCU-DP) and line interface unit (LIU) components of an existing D4 channel bank, that enables the RNPCM bus of the channel bank's internal communications link to be controllably tri-stated for bidirectional signalling capability. The bidirectional signalling format on the controllably tri-stated RNPCM signalling bus is defined to support both the transmission of incoming (received DS1) signalling traffic from the line interface unit to an office channel unit, and the exchange of performance-monitoring (PM) command and response messages related to the operation of a DS0 loop, in a manner that is transparent to digital services subscribers. Pursuant to this PM scheme, one or one or more performance aspects of the DS0 channel are monitored and stored, in each of the channel unit-to-DDST direction and the DDST-to-channel unit direction. DS0 channel quality-representative messages are then forwarded to the line interface unit over the bidirectional RNPCM bus and reported to a supervisory control unit external to the channel bank, in response to a command message from the line interface unit.

The '288 application describes a further modification of the data communication format on the RNPCM bus to include two additional non-normal data communication formats, referred to as RNPCM INIT data format and RNPCM SMART data format. The RNPCM INIT data format is employed during an initialization (INIT) mode of operation of an upgraded channel bank to convey initialization command messages from a 'smart' (i.e. performance monitoring-capable) line interface unit to a smart channel unit. The RNPCM SMART format is used during a 'Smart' mode of operation of an upgraded channel bank, to convey command messages from an upgraded, performance monitoring-capable, 'smart' line interface unit to an upgraded, performance monitoring-capable 'smart' channel unit, as well as to convey response messages from a smart channel unit to the smart line interface unit. It is also used to prevent the occurrence of false yellow alarms. An enhanced smart performance monitoring (PM) line interface unit portion of an upgraded D4 channel bank includes the same signalling, timing and control components as a conventional line interface unit, plus additional circuitry which effectively converts a conventional line interface unit into a smart performance-monitoring line interface unit (PM-LIU).

Because the enhanced D4 channel bank architectures described in each of the '665 patent and the '288 application provide substantially improved functionality with respect to a conventional channel bank architectures, especially the ability to conduct network maintenance operations (including connectivity configuration, performance and status monitoring) from a remote site, users of the improved equipment would now prefer, to the extent possible, to perform all equipment configuration, maintenance and operation status related tasks from a central supervisory facility, thereby minimizing the need for field personnel to travel to and perform local equipment maintenance and configuration assignments.

One principal concern of the system operator is the knowledge of what equipment is currently plugged into the backplane slots of the channel bank, and how both that equipment and its attendant network is configured. Although a D4 channel bank backplane has provision for multiple (e.g., 24) channel units, not every channel unit connector slot will necessarily have a channel unit installed at each position, and the knowledge of which channel bank slots are occupied is necessary for meeting customer service demands. In order to determine which channel unit connector slots of a channel bank are occupied it is currently necessary for maintenance personnel to gain physical access to the interior of the channel bank cabinet and visually inspect the channel bank's connector slot positions. It would be desirable to devise a technique that would permit such a determination to be conducted remotely, similar to the remote monitoring and control capabilities of the enhancements described in the '665 patent and the '288 application.

SUMMARY OF THE INVENTION

In accordance with the present invention, this objective is achieved by taking advantage of the fact that the D4 channel bank architecture couples the TDATA lead through a pull-up resistor to a logical '1' voltage level. If no channel unit connector slot is empty, then during the TDM time slot associated with that channel unit connector slot, the state of the TDATA lead should be pulled high to an all '1's condition, ostensibly indicating that the channel unit connector slot is unoccupied, and thereby available to receive a channel unit for servicing a customer. However, since an all '1's code constitutes a valid (and common) data pattern that may be transmitted by a customer's equipment (as in the case of an idle condition of the equipment), detecting such a pattern on the TDATA lead is not necessarily determinative that the associated channel unit connector slot is empty.

The present invention solves this potential data bus misinterpretation problem by controllably decoupling the TDATA bus from the pull-up resistor, and substituting a 'soft' or reduced resistance value, pull-down resistor, in its place during the channel unit time slot of interest. The pull-down resistor is coupled to a voltage associated with a logical '0' condition. Because of its reduced resistance value, the pull-down resistor will not corrupt data signals on the TDATA bus, so that if a channel unit is actually installed in the channel unit connector slot of interest, the pull-down resistor will not prevent the TDATA bus from being driven to the intended logic level. On the other hand, if no channel unit is installed in the channel unit connector slot of interest, the TDATA bus will be pulled down to a '0' logic level during that channel unit's time slot, indicating that the channel unit connector slot is empty.

Pursuant to a preferred embodiment of the invention, during a respective time slot associated with the respective channel unit connector slot of interest, with the TDATA bus initially defaulted through the pull-up resistor to a first voltage associated with a logical '1' condition, the TDATA bus is monitored for data representative of the presence of a channel unit in that channel unit connector slot. In particular, with the TDATA bus pulled-up to the first voltage, for a first time slot associated with the channel unit connector slot of interest, if the data on the bus is not all '1's, then it is inferred that a channel unit is installed in that connector slot.

However, if the data on the bus is all '1's, indicative of a potentially empty channel unit connector slot, then, during an immediately subsequent time slot associated with that channel unit connector slot, the TDATA bus is decoupled from the pull-up resistor to the first voltage, and controllably coupled through the pull-down resistor to a second voltage associated with a logical '0' condition. If the data on the bus is now all '0's, it is inferred that the previously read all '1's condition was due to the fact that no channel unit is installed in that slot position, so that what was read was simply the pulled high state of the TDATA bus. However, if the data on the TDATA bus is not all '0's, then it is inferred that the previously read all '1's condition was actual data asserted by a channel unit installed in that slot position, and the channel unit connector slot of interest is declared as being occupied.

Because of the inherent time delay between the last bit transmitted by a channel unit associated with a respective time slot $T_i$ and the first bit transmitted by a channel unit associated with the next time slot $T_{i+1}$, an initial portion of each time slot is masked to avoid misinterpreting the TDATA lead. The time constant parameters of the TDATA bus are such that the first two bits of a time slot are ignored.

DETAILED DESCRIPTION

Figure 1:
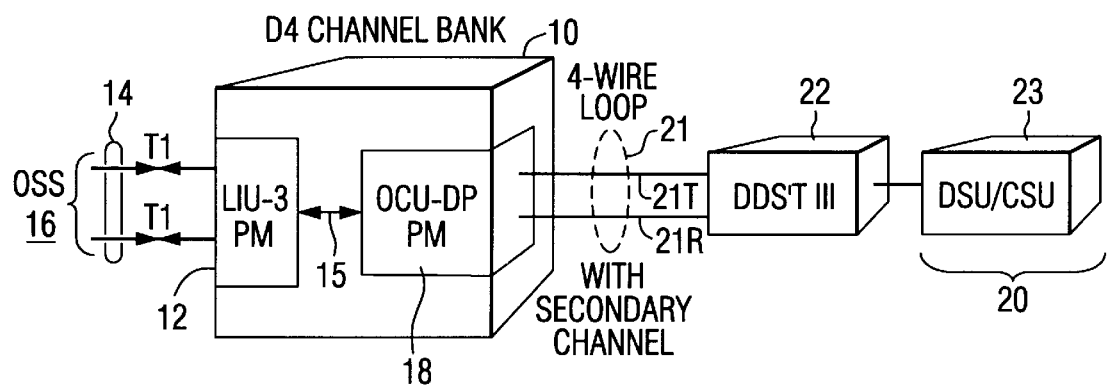
FIG. 1 diagrammatically illustrates an AT&T-compatible D4 channel bank installed in a typical digital carrier telephone network, through which digital services may be provided by the network to digital signalling equipment located at a customer's premises.

Before describing in detail the channel unit connector slot occupancy determination mechanism in accordance with the present invention, it should be observed that the invention resides primarily in a minor hardware modification of the bus architecture of a conventional D4 channel bank, together with an augmentation of the communications control software employed by the channel bank's supervisory performance monitoring controller for selectively biasing and evaluating the electrical condition of the channel bank's TDATA bus. The details of the circuitry of the line interface and channel units are otherwise essentially unaffected.

Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
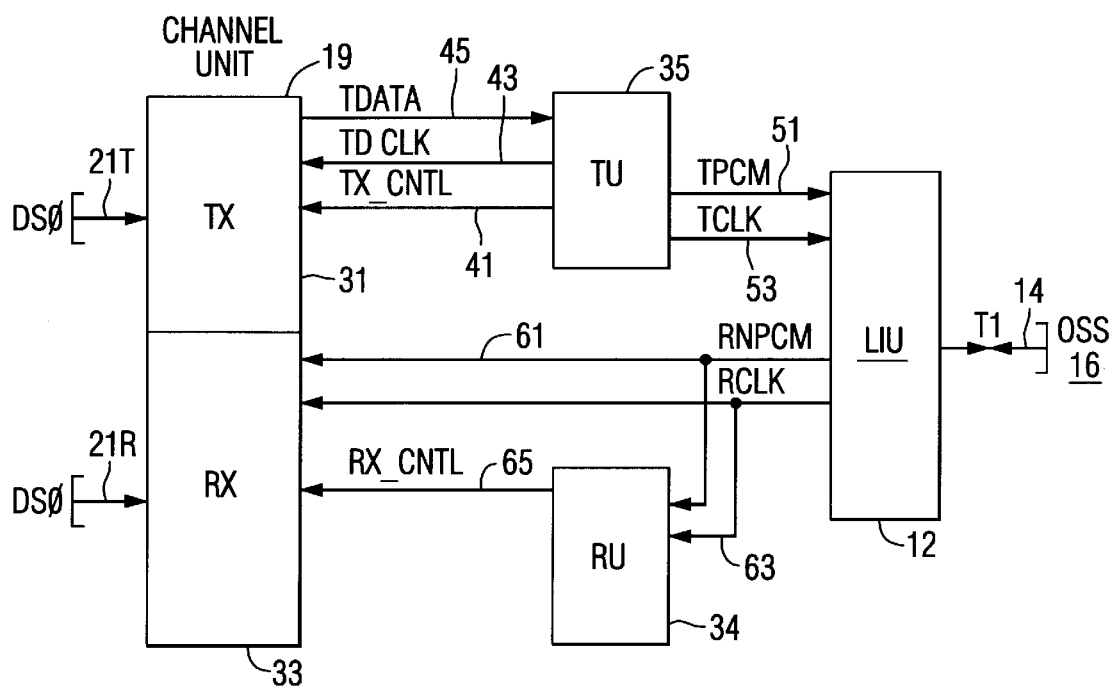
FIG. 2 diagrammatically shows the manner in which a line interface unit and an office channel unit data port of a D4 channel bank communicate with one another by way of a PCM communications link.
Figure 3:
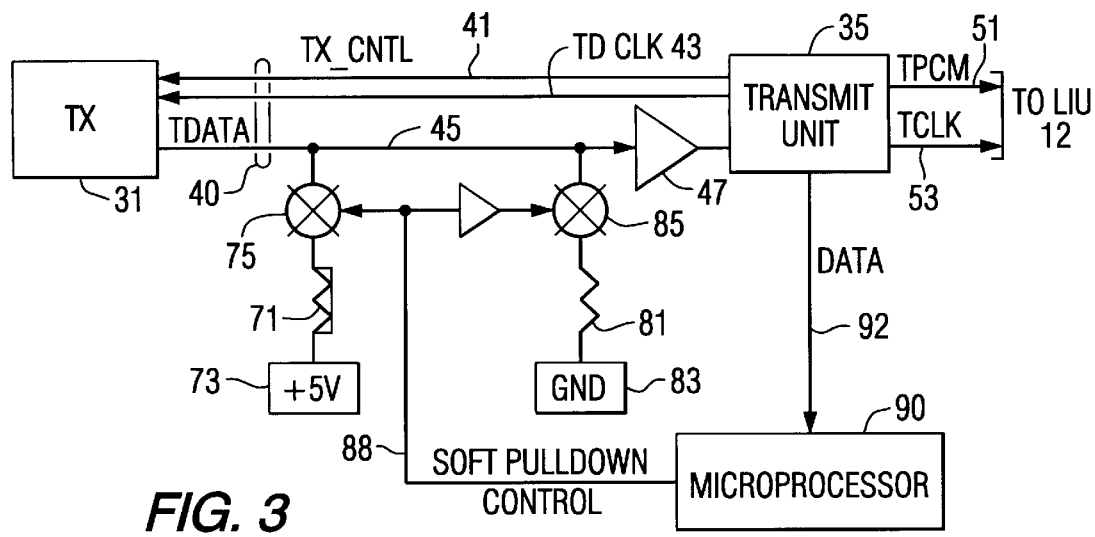
FIG. 3 diagrammatically illustrates the manner in which the TDATA bus of FIG. 2 is modified in accordance with the present invention, to provide for the controlled substitution of a pull-down resistor in place of its normally connected pull-up resistor, for reading the state of the TDATA bus to determine channel unit connector slot occupancy.

FIG. 3 diagrammatically illustrates the manner in which the component and TDATA bus architecture of FIG. 2, described above, is modified in accordance with the present invention to provide for the controlled substitution of a pull-down resistor in place of its normally connected pull-up resistor, thereby allowing the state of the TDATA bus to be analyzed to accurately determine whether the channel unit connector slot of interest is empty or occupied. As in the diagrammatic illustration of FIG. 2, FIG. 3 shows the transmitter section 31 of a respective channel unit within the D4 channel bank's OCU-DP coupled via transmission links 41, 43 and 45 of a transmission bus arrangement 40 to the transmit unit 35.

As described previously, the control link 41 contains transmit sequence control leads that carry transmission control signals TX_CNTL signals from the transmit unit 35 for controlling the format of data transmissions from the channel unit on the TDATA bus 45, while link 43 is a clock lead on which a transmit clock signal TD-CLK is asserted by the transmitter section 31. The TDATA bus 45 is normally permanently coupled through a pull-up resistor 71 to a logical '1' representative voltage node 73, and is used to convey a data packet from the transmitter section 31 of the channel unit to the transmit unit 35, during a respective time slot assigned to that channel unit.

Rather than permanently couple the TDATA bus 45 through the pull-up resistor 71 to logical high voltage node 73, the present invention couples bus 45 to the pull-up resistor 71 through a normally closed controlled switch 75. As will be described, switch 75 is controlled via a line 88 from the channel bank's attendant supervisory microprocessor 90, so as to selectively remove the pulled high condition of the TDATA bus 45 in the course of examining the electrical condition of the bus 45 to determine whether a selected channel unit connector slot is occupied or empty.

For this purpose, the TDATA bus 45 is also coupled to a pull-down resistor 81 through a normally open controlled switch 85. Pull-down resistor 81 is a 'soft' or reduced resistance value component and is coupled to a low or '0' logic level representative voltage node 83. By 'soft' or reduced resistance value is meant that the pull-down resistor 85, when controllably asserted onto the TDATA bus 45 by control processor 90, will not significantly load a transmitting channel unit and thereby corrupt data signals on the TDATA bus 45. Since switch 85 is normally open, the TDATA bus 45 is normally not coupled through the pull-down resistor 81 to a logical low condition, but instead is pulled-high by the pull-up resistor 71, as described above.

Figure 4:
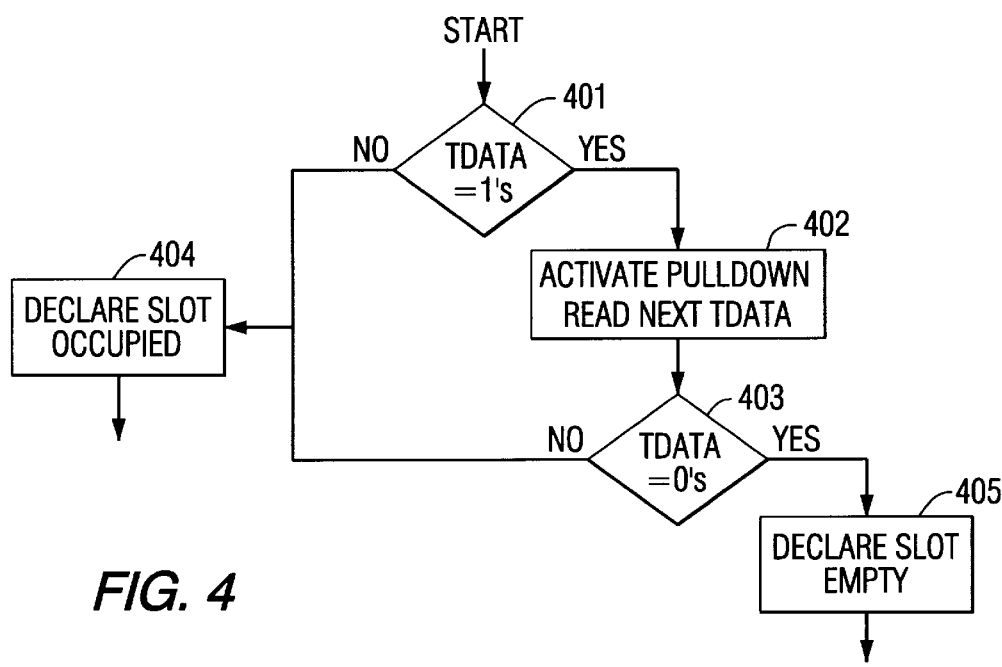
FIG. 4 is a flow chart showing the sequence of steps carried out by the channel bank's supervisory control processor to control the operation of the modified TDATA bus architecture of FIG. 3.

The operation of the modified TDATA bus architecture of FIG. 3 may be understood by reference to the flow chart of FIG. 4, which, when executed by the control processor 90 is operative to determine whether a channel connector slot of interest is empty or occupied, for a respective time slot associated with the respective channel unit connector slot of interest. As pointed out above, the TDATA bus is normally defaulted through closed switch 75 and pull-up resistor 71 to a node 73 to which a voltage associated with a logical '1' condition is supplied.

At the beginning of the routine, during the time slot of interest, via a buffer read data bus 92, control processor 90 reads the data packet that has been conveyed over the TDATA bus 45 through an amplifier 47 and buffered in the transmit unit 35 for transmission to the line interface unit. With the switch 75 defaulted to its closed state, the TDATA bus 45 will be pulled-up to the first voltage via pull-up resistor 71. If the data packet is all '1's (the answer to query step 401 is YES), the routine proceeds to query step 403, where the contents of the next data packet are examined to determine if its contents are all '0's.

If the data packet for the channel unit time slot of interest ($t_i$) is not all '1's (the answer to query step 401 is NO), then it is inferred that a channel unit is installed in that connector slot, and the channel unit slot is declared occupied in step 404. However, when the answer to query step 401 is YES, associated with an all '1's condition and a potentially empty channel unit connector slot, then, as shown by step 402, during an immediately subsequent time slot associated with that channel unit connector slot, the TDATA bus is decoupled from the pull-up resistor 71, and controllably coupled through the pull-down resistor 81 to the voltage node 83 associated with a logical '0' condition.

Since the answer to query step 401 was YES, the routine transitions to step 403, which examines the data on the TDATA bus 45 to determine whether the data packet currently being asserted in the next time slot for the channel unit of interest, namely during time slot ($t_{i+24}$), is now all '0's. If the answer to query step 403 is YES, it is inferred that the previously detected all '1's condition (the answer to query step 401 is YES) was due to the fact that no channel unit has been installed in that slot position, so that what caused the flag=1 condition was simply the pulled high state of the TDATA bus 45. As a result, the channel unit connector slot of interest is declared as being empty occupied in step 405.

On the other hand, if the data on the TDATA bus is not all '0's (the answer to query step 403 is NO), then it is inferred that whatever caused the all '1's condition at query step 401 was actual data being asserted by a channel unit installed in that slot position, and the channel unit connector slot of interest is declared as being occupied in step 404.

As described briefly above, the inherent capacitance of the TDATA lead 45 (which is defined by the backplane material capacitance and the number of channel units currently installed in the channel bank) and the resistance of the pull-up resistor 71 between the TDATA lead 45 and the pull-up voltage define a TDATA bus time constant. Because this data bus time constant is variable, the rise time of the TDATA bus from the last bit of an immediately preceding time slot $t_{i-1}$ to a time slot $t_i$ of interest is non-deterministic, and may overlap an initial portion of the time slot $t_i$.

Figure 5:
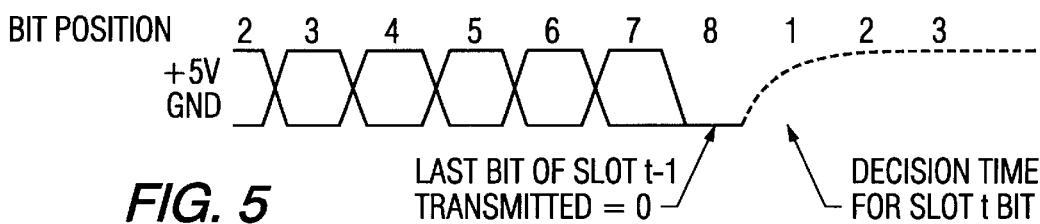
FIG. 5 diagrammatically illustrates a non-limiting example of the state of the TDATA bus 45 of FIG. 3 for a pair of sequential time slots.

As an example, consider a pair of sequential time slots of the TDATA bus, diagrammatically illustrated in FIG. 5, where the channel unit connector slot associated with an immediately preceding time slot $t_{i-1}$ is occupied, and the channel unit connector slot associated with the time slot $t_i$ of interest is empty. If the last bit of the time slot $t_{i-1}$ is a '0', then the time required for the first bit of the time slot $t_i$ to reach a valid '1' state will be delayed by the time constant of the bus, corrupting the front end (at least the first bit position) of the data of the time slot $t_i$, and causing the contents of the data for time slot $t_i$ to be misinterpreted by control processor 90.

To avoid this problem, an initial portion of each time slot is masked or ignored. As a non-limiting example, for the above described time constant parameters of the TDATA bus 45, the processor 90 ignores or masks the first two bits of a time slot in the course of determining whether the channel unit connector slot is occupied or empty. Thus, for an eight bit byte, any of the hex patterns FF, 7F or 3F will be recognized as a valid all '1's condition. Thus, detecting whether a channel unit connector slot of interest is empty will be independent of, and therefore not affected by, any data activity associated with a channel unit associated with a time slot that immediately precedes the time slot associated with the channel connector slot of interest.

As will be appreciated from the foregoing description, the desire of a communication system operator to determine from a location remote to a channel bank which of its channel unit connector slots are occupied, without having to gain physical access to the interior of the channel bank cabinet and visually inspect the channel bank's backplane slot positions, is successfully achieved in accordance with the present invention, by taking advantage of the fact that the D4 channel bank architecture couples the TDATA lead through a pull-up resistor to a prescribed logical state ('1') representative voltage level.

By controllably decoupling the TDATA bus from the pull-up resistor, and substituting a 'soft' pull-down resistor (coupled to a logical '0' representative voltage) in its place, during the time slot of interest, the TDATA bus will not be prevented from being driven to the intended logic level by an installed channel unit. On the other hand, if no channel unit is installed in that connector slot, the TDATA bus will be pulled down to a '0' logic level, indicating that the channel unit connector slot is empty.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a telephone communication network channel bank located at a first site and including a plurality of channel unit connector slots for respectively installing one channel unit, a channel unit communicating with a customer site over a communication path therebetween, and being operative, during a respective time slot, to transmit digital communication signals over an intra-channel bank communication link to a line interface unit, said line interface unit being operative to transmit digital communication signals over a time division multiplex communication link to a second site, a method of detecting whether a channel unit connector slot has a channel unit installed therein comprising the steps of:

(a) during a time slot associated with said channel unit connector slot of said channel bank, controllably asserting a prescribed electrical condition on said intra-channel bank communication link;

(b) monitoring said intra-channel bank communication link for data signals different from said prescribed electrical condition asserted by a potential channel unit which may be installed in said connector slot;

(c) in the absence of detecting any data signals different from said prescribed electrical condition asserted by said potential channel unit during said time slot, declaring said connector slot to contain no channel unit.

2. A method according to claim 1, wherein step (c) further includes, in response to detecting said any data signals different from said prescribed electrical condition asserted by said potential channel unit during said time slot, declaring said connector slot to contain a channel unit.

3. A method according to claim 1, wherein step (a) comprises controllably coupling said intra-channel bank communication link through a pull-down resistor to a prescribed electrical voltage.

4. A method according to claim 1, wherein said intra-channel bank communication link is normally coupled through a pull-up resistor to a first voltage representative of a first data logic state, and wherein step (a) comprises, during said time slot associated with said channel unit connector slot of said channel bank, controllably decoupling said intra-channel bank communication link from said first voltage via said pull-up resistor, and controllably coupling said intra-channel bank communication link through a pull-down resistor to a second voltage associated with a second data logic state.

5. A method according to claim 4, wherein said pull-down resistor has a value that does not corrupt data signals on said intra-channel bank communication link.

6. A method according to claim 1, wherein step (a) comprises coupling said intra-channel bank communication link through a pull-up resistor to a first voltage representative of a first data logic state, and monitoring said intra-channel bank communication link during a first time slot for the presence of a first data pattern and, in response to detecting said first data pattern, controllably decoupling said intra-channel bank communication link from said first voltage via said pull-up resistor, controllably coupling said intra-channel bank communication link through a pull-down resistor to a second voltage associated with a second data logic state, and wherein step (b) comprises, during a second time slot, monitoring said intra-channel bank communication link for the presence of a second data pattern, and wherein step (c) comprises, in response to detecting said second data pattern during said second time slot, declaring said connector slot to contain no channel unit.

7. A method according to claim 6, wherein step (c) comprises, in the absence of detecting said second data pattern during said second time slot, declaring said connector slot to contain a channel unit.

8. A method according to claim 6, wherein step (a) comprises monitoring said intra-channel bank communication link during only a selected portion of said first time slot.

9. A method according to claim 8, wherein step (a) includes masking an initial portion of said first time slot.

10. A method according to claim 9, wherein step (a) includes masking a selected number of initial bits of said first time slot.

11. A method according to claim 10, wherein step (a) includes monitoring said first time slot for the presence of any of the hex patterns FF, 7F and 3F.

12. A method according to claim 6, wherein said second data pattern comprises the hex pattern 00.

13. For use with a telephone communication network channel bank located at a first network site and including a plurality of channel unit connector slots in which channel units are installed, a channel unit communicating with a customer site over a communication path therebetween, and being operative, during a time slot, to transmit digital communication signals over an intra-channel bank communication link to a line interface unit, said line interface unit being operative to transmit digital communication signals over a time division multiplex communication link to a second site, a method of detecting whether a channel unit connector slot has a channel unit installed therein comprising the steps of:

(a) during a time slot associated with said channel unit connector slot of said channel bank, controllably coupling said intra-channel bank communication link to a first voltage, and monitoring said intra-channel bank communication link for data signals different from said first voltage asserted by a potential channel unit which may be installed in said connector slot; and (b) in response to step (a) failing to detect data signals different from said first voltage asserted by said potential channel unit which may be installed in said connector slot, declaring said connector slot to contain no channel unit.

14. A method according to claim 13, wherein said intra-channel bank communication link is normally coupled through a pull-up resistor to said first voltage representative of a first data logic state, and wherein step (b) comprises, in response to step (a) detecting a first data pattern associated with said first data logic state, then, during a subsequent time slot, controllably decoupling said intra-channel bank communication link from said first voltage via said pull-up resistor, and controllably coupling said intra-channel bank communication link through a pull-down resistor to a second voltage associated with a second data logic state, and monitoring said intra-channel bank communication link during for the presence of a second data pattern associated with said second data logic state, and, in response to detecting said second data pattern during said subsequent time slot, declaring said connector slot to contain no channel unit.

15. A method according to claim 14, wherein step comprises, in response to not detecting said second data pattern during said subsequent time slot, declaring said connector slot to contain a channel unit.

16. A method according to claim 14, wherein said pull-down resistor has a value that does not corrupt data signals on said intra-channel bank communication link.

17. A method according to claim 14, wherein step (a) comprises monitoring said intra-channel bank communication link during only a selected portion of said respective time slot.

18. A method according to claim 17, wherein step (a) includes masking an initial portion of said first time slot.

19. A method according to claim 18, wherein step (a) includes masking a selected number of initial bits of said first time slot.

20. A method according to claim 19, wherein step (a) includes monitoring said first time slot for the presence of any of the hex patterns FF, 7F and 3F.

21. A method according to claim 20, wherein said second data pattern comprises an all '0's data pattern.

22. For use with a telephone communication network channel bank located at a first site and including a plurality of channel unit connector slots for installing one or more respective channel units, a respective channel unit communicating with a customer site over a communication path therebetween, and being operative, during a respective time slot, to transmit digital communication signals over an intra-channel bank communication link to a line interface unit, said line interface unit being operative to transmit digital communication signals over a time division multiplex communication link to a second site, an arrangement for detecting whether a respective channel unit connector slot has a channel unit installed therein comprising:

a pull-up resistor through which said intra-channel bank communication link is controllably coupled to a first voltage representative of a first data logic state;

a pull-down resistor through which said intra-channel bank communication link is controllably coupled to a second voltage representative of a second data logic state; and a communications control processor which is operative, during a first time slot associated with said respective channel unit connector slot of said channel bank, to controllably couple said intra-channel bank communication link through said pull-up resistor to said first voltage and monitor said intra-channel bank communication link for data signals representative of the presence of said respective channel unit in said respective connector slot and, in response to detecting said data signals representative of the presence of said respective channel unit in said respective connector slot, to declare said respective connector slot to contain an associated channel unit.

23. An arrangement according to claim 22, wherein said communications control processor is operative, in response to not detecting said data signals representative of the presence of said respective channel unit in said respective connector slot, during said first time slot, to controllably decouple said intra-channel bank communication link from said first voltage via said pull-up resistor and controllably couple said intra-channel bank communication link through a pull-down resistor to a second voltage associated with a second data logic state, to monitor said intra-channel bank communication link during a second time slot for data signals representative of the presence of said respective channel unit in said respective connector slot and, in the absence of detecting said data signals during said second time slot, declaring said respective connector slot to contain no associated channel unit.

24. An arrangement according to claim 23, wherein said communications control processor is operative, in response to not detecting said data signals representative of the presence of said respective channel unit in said respective connector slot during said second time slot, to declare said respective connector slot to contain an associated channel unit.

25. An arrangement according to claim 22, wherein said pull-down resistor has a value that does not corrupt data signals on said intra-channel bank communication link.

26. An arrangement according to claim 22, wherein said communications control processor is operative to monitor said intra-channel bank communication link during only a selected portion of said first time slot.

27. An arrangement according to claim 26, wherein said communications control processor is operative to mask an initial portion of said first time slot.

28. An arrangement according to claim 27, wherein said communications control processor is operative to mask a selected number of initial bits of said first time slot.

29. An arrangement according to claim 27, wherein said communications control processor is operative to monitor said first time slot for the presence of any of the hex patterns FF, 7F and 3F.

30. An arrangement according to claim 23, wherein said communications control processor is operative to declare said respective connector slot to contain no associated channel unit in response to detecting an all '0's data pattern during said second time slot.

31. A channel bank data bus monitoring scheme for determining whether a channel unit connector slot is occupied comprising the steps of:

(a) for a respective channel unit connector slot, initially pulling a channel bank data bus high via a pull-up resistor and monitoring said data bus for a multiple '1's data pattern during a first time slot;

(b) in response to data on said bus not being said multiple '1's data pattern, declaring that a channel unit is installed in said channel unit connector slot, but if said multiple '1's data pattern is detected, then, during a second time slot for that channel unit, decoupling said data bus from said pull-up resistor and coupling said data bus instead to a pull-down resistor, and monitoring said data bus for an all '0's data pattern; and (c) in response to data on said bus being all '0's, declaring said channel unit connector slot being empty, but if data on said data bus is not all '0's declaring that a channel unit is installed in said channel unit connector slot.

32. A channel bank data bus monitoring scheme according to claim 31, wherein step (a) comprises monitoring said intra-channel bank communication link during only a selected number of bits of said first time slot.

33. A channel bank data bus monitoring scheme according to claim 31, wherein said multiple '1's data pattern comprises any of the hex patterns FF, 7F and 3F.

34. For use with a telephone communication network channel bank located at a first site and having a plurality of channel unit connector slots in which one or more channel units may be installed, a channel unit communicating with a customer site over a communication path therebetween, and being operative, during a time slot, to transmit digital communication signals over an intra-channel bank communications link to a line interface unit, said line interface unit being operative to transmit digital communication signals over a time division multiplex communication link to a second site, a method of detecting whether a channel unit connector slot has an actual channel unit installed therein comprising the steps of:

(a) during a time slot associated with said channel unit connector slot, controllably asserting, on said intra-channel bank communications link, a prescribed electrical condition that will not impair any data asserted on said intra-channel bank communications link by a potential channel unit that may be installed in said channel unit connector slot; and (b) in the absence of assertion of any data different from said prescribed electrical condition on said intra-channel bank communications link during said time slot, declaring that said channel unit connector slot contains no channel unit.

35. A method according to claim 34, wherein step (a) comprises placing said intra-channel bank communications link in a first logical state, and step (b) further comprises, in response to the assertion of any data other than said first logical state on said intra-channel bank communications link during any portion of said time slot, declaring that said channel unit connector slot contains an actual channel unit.

36. A method according to claim 34, wherein said intra-channel bank communications link corresponds to a TDATA lead of a channel backplane.

* * * * *